United States Patent
Radovic et al.

(10) Patent No.: US 9,672,298 B2
(45) Date of Patent: Jun. 6, 2017

(54) PRECISE EXECECUTION OF VERSIONED STORE INSTRUCTIONS

(71) Applicant: Oracle International Corporation, Redwood Shores, CA (US)

(72) Inventors: Zoran Radovic, Alvsjo (SE); Jared C. Smolens, Santa Clara, CA (US); Robert T. Golla, Austin, TX (US); Paul J. Jordan, Austin, TX (US); Mark A. Luttrell, Cedar Park, TX (US)

(73) Assignee: Oracle International Corporation, Redwood Shores, CA (US)

( * ) Notice: Subject to any disclaimer, the term of this patent is extended or adjusted under 35 U.S.C. 154(b) by 250 days.

(21) Appl. No.: 14/267,734

(22) Filed: May 1, 2014

(65) Prior Publication Data
US 2015/0317338 A1 Nov. 5, 2015

(51) Int. Cl.
*G06F 17/30* (2006.01)
*G06F 11/08* (2006.01)
(Continued)

(52) U.S. Cl.
CPC .... *G06F 17/30985* (2013.01); *G06F 9/30043* (2013.01); *G06F 9/3834* (2013.01); *G06F 9/3855* (2013.01); *G06F 9/3859* (2013.01); *G06F 11/08* (2013.01); *G06F 17/30309* (2013.01); *G06F 17/30507* (2013.01); *G06F 17/30864* (2013.01)

(58) Field of Classification Search
CPC .... G06F 9/3836; G06F 9/3855; G06F 9/3885; G06F 9/3838; G06F 9/3865
See application file for complete search history.

(56) References Cited

U.S. PATENT DOCUMENTS

| | | | |
|---|---|---|---|
| 3,868,632 | A | 2/1975 | Hong et al. |
| 4,608,687 | A | 8/1986 | Dutton |

(Continued)

OTHER PUBLICATIONS

Darryl J. Gove, et al., "Maximizing Encodings of Version Control Bits for Memory Corruption Detection," U.S. Appl. No. 13/198,904, filed Aug. 5, 2011, 60 pages.
(Continued)

*Primary Examiner* — Carol Choi
(74) *Attorney, Agent, or Firm* — Meyertons, Hood, Kivlin, Kowert & Goetzel, P.C.

(57) ABSTRACT

Techniques for executing versioned memory access instructions. In one embodiment, a processor is configured to execute versioned store instructions of a first thread within a first mode of operation. In this embodiment, in the first mode of operation, the processor is configured to retire a versioned store instruction only after a version comparison has been performed for the versioned store instruction. In this embodiment the processor is configured to suppress retirement of instructions in the first thread that are younger than an oldest versioned store instruction until the oldest versioned store instruction has retired. In some embodiments, the processor is configured to execute versioned store instructions of a given thread within a second mode of operation, in which the processor is configured to retire outstanding versioned store instructions before a version comparison has been performed.

17 Claims, 9 Drawing Sheets

(51) Int. Cl.
*G06F 9/30* (2006.01)
*G06F 9/38* (2006.01)

(56) References Cited

U.S. PATENT DOCUMENTS

| | | | |
|---|---|---|---|
| 4,646,312 | A | 2/1987 | Goldsbury et al. |
| 4,761,785 | A | 8/1988 | Clark et al. |
| 5,014,273 | A | 5/1991 | Gagliardo et al. |
| 5,081,626 | A | 1/1992 | Scott |
| 5,276,834 | A | 1/1994 | Mauritz et al. |
| 5,305,326 | A | 4/1994 | Solomon et al. |
| 5,577,243 | A | 11/1996 | Sherwood et al. |
| 5,627,965 | A | 5/1997 | Liddell et al. |
| 5,745,508 | A | 4/1998 | Prohofsky |
| 5,754,567 | A | 5/1998 | Norman |
| 5,856,987 | A | 1/1999 | Holman |
| 5,872,798 | A | 2/1999 | Baggen et al. |
| 5,889,940 | A | 3/1999 | Liddell et al. |
| 6,035,432 | A | 3/2000 | Jeddeloh |
| 6,038,684 | A | 3/2000 | Liddell et al. |
| 6,047,392 | A | 4/2000 | Liddell et al. |
| 6,049,893 | A | 4/2000 | Liddell et al. |
| 6,092,218 | A | 7/2000 | Liddell et al. |
| 6,134,672 | A | 10/2000 | Liddell et al. |
| 6,134,679 | A | 10/2000 | Liddell et al. |
| 6,141,766 | A | 10/2000 | Liddell et al. |
| 6,170,068 | B1 | 1/2001 | Liddell et al. |
| 6,173,416 | B1 | 1/2001 | Liddell et al. |
| 6,480,982 | B1 | 11/2002 | Chan et al. |
| 6,519,704 | B1 | 2/2003 | Liddell et al. |
| 6,539,513 | B1 | 3/2003 | Chen |
| 6,574,768 | B2 | 6/2003 | Cypher |
| 6,804,799 | B2 | 10/2004 | Zuraski, Jr. |
| 6,912,686 | B1 | 6/2005 | Rodriguez et al. |
| 6,973,613 | B2 | 12/2005 | Cypher |
| 7,020,811 | B2 | 3/2006 | Byrd |
| 7,036,066 | B2 | 4/2006 | Weibel et al. |
| 7,099,659 | B1 | 8/2006 | Schnake et al. |
| 7,103,824 | B2 | 9/2006 | Halford |
| 7,188,296 | B1 | 3/2007 | Cypher |
| 7,257,666 | B2 | 8/2007 | Komatsu et al. |
| 7,530,008 | B2 | 5/2009 | Das et al. |
| 7,788,506 | B2 | 8/2010 | Bancel et al. |
| 7,992,061 | B2 | 8/2011 | Zeng |
| 2002/0178346 | A1* | 11/2002 | Elias ............... G06F 9/30072 712/217 |
| 2003/0074630 | A1 | 4/2003 | Batson et al. |
| 2004/0250028 | A1 | 12/2004 | Daniels et al. |
| 2004/0255225 | A1 | 12/2004 | Takai |
| 2006/0190707 | A1* | 8/2006 | McIlvaine .......... G06F 9/3836 712/219 |
| 2008/0022154 | A1 | 1/2008 | Endou |
| 2011/0029809 | A1 | 2/2011 | Dhuse et al. |
| 2011/0047334 | A1* | 2/2011 | Eichenberger ...... G06F 11/1405 711/141 |
| 2012/0137074 | A1 | 5/2012 | Kim et al. |
| 2013/0036276 | A1* | 2/2013 | Radovic ............. G06F 9/3824 711/159 |
| 2015/0095627 | A1* | 4/2015 | Dechene ........... G06F 9/30145 712/228 |

OTHER PUBLICATIONS

Zoran Radovic, et al., "Instructions to Set and Read Memory Version Information," U.S. Appl. No. 13/196,514, filed Aug. 2, 2011, 41 pages.

Zoran Radovic, et al., "Efficient Storage of Memory Version Data," U.S. Appl. No. 13/178,240, filed Jul. 7, 2011, 39 pages.

* cited by examiner

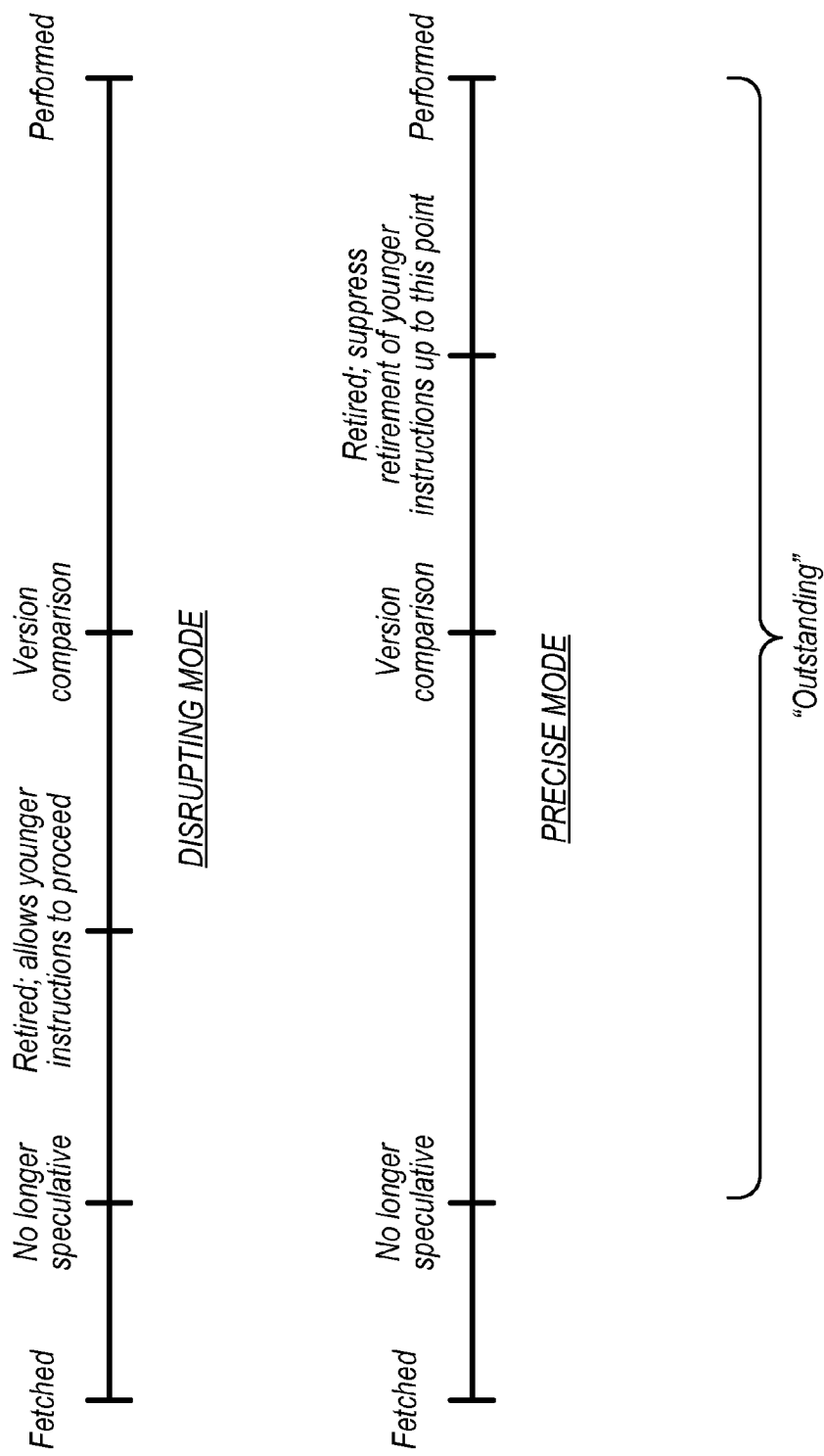

Memory Corruption
Detection State

"0"

"1"

Version Bits 510

Sign Extended Bits 520

Virtual Address Bits 530

| MISMATCH | Memory Stored Version Number | | |
|---|---|---|---|
| | A | B | Reserved |
| Memory Access Address Version Number from Processor  —  A | 0 | 1 | 0 |
| B | 1 | 0 | 0 |
| Reserved | 1 | 1 | 0 |

*FIG. 6* ns
PRECISE EXCECUTION OF VERSIONED STORE INSTRUCTIONS

CROSS-REFERENCE TO RELATED APPLICATIONS

The following applications are related to the present disclosure:

U.S. application Ser. No. 13/178,240, entitled "Efficient Storage of Memory Version Data," filed Jul. 7, 2011 and published as U.S. Pub. Pat. Appl. No. 2013/0036276;

U.S. application Ser. No. 13/196,514, entitled "Instructions to Set and Read Memory Version Information," filed Aug. 2, 2011 and published as U.S. Pub. Pat. Appl. No. 2013/0036276;

U.S. application Ser. No. 13/198,904, entitled "Maximizing Encodings of Version Control Bits for Memory Corruption Detection," filed Aug. 5, 2011 and issued as U.S. Pat. No. 8,572,441; and U.S. application Ser. No. 13/658,789, entitled "Block Memory Engine with Memory Corruption Detection," filed Oct. 23, 2012.

Each of the above applications is incorporated by reference herein in their entireties. To the extent that any definitions or explanations in the above applications conflicts with definitions given in the present disclosure, the present disclosure controls.

BACKGROUND

Field of the Invention

This invention relates to computing systems, and more particularly to memory corruption detection.

Description of the Related Art

Memory corruption may occur when the contents of a memory location are unintentionally modified due to programming errors. One example of such corruption is an access of a byte of memory past the end of the array of bytes reserved for a particular data structure. In addition, memory corruption may occur when the contents of a memory location are intentionally modified by a malicious attack. When the corrupted memory contents are used later in the computer program, it may lead either to a program crash or to unexpected program behavior. Some programming languages (for example, C and C++) include features such as explicit memory management and pointer arithmetic. These features allow development of efficient applications and system software. However, when a computer programmer incorrectly uses these features, memory corruption may occur. "Memory corruption" is used in a broad sense and may refer to various issues such as bad pointers, buffer overruns, malicious attacks, etc.

A computer programming language may be characterized as "type safe" when the language does not permit a computer programmer to use a value as a data type to which it does not belong. For example, a type safe programming language does not allow conversion of an integer variable to a pointer value. The C programming language is one example of a "type unsafe" language due to casting, particularly the casting of pointers to void pointers and back. The C++ programming language includes most of the C programming language as a subset. Therefore, the C++ programming language inherits the "type unsafe" property.

A computer programming language may be characterized as "memory safe" when the language allows programs to release a portion of memory when it is determined the portion of memory is unused for the remainder of the program evaluation. A programming language that is "memory unsafe" may cause security vulnerabilities with random-access memory (RAM) access, such as buffer overflows and dangling pointers. Programming languages, such as C and C++, that support arbitrary pointer arithmetic, casting, and deallocation are typically "memory unsafe". Some high-level programming languages are memory safe due to disallowing pointer arithmetic and casting, and enforcing tracing garbage collection. However, programming efficiency may be reduced.

Many malicious attacks reduce system security through memory corruption and may exploit memory unsafe and/or type unsafe characteristics of a programming language. For example, a type unsafe language may not prevent programming errors such as allowing user input to be used as a pointer value. A malicious attacker may exploit such programming errors to create memory corruption attacks and access various portions of programs or data. Other examples of programming errors include vulnerabilities regarding buffer overflow, heap corruption (such as heap buffer overflow and double free), integer overflow, and format strings.

When memory corruption is detected, precise identification of a memory access instruction that caused the corruption and the associated program state may be very helpful to application developers, e.g., for debugging purposes.

SUMMARY

Techniques for executing versioned memory access instructions are contemplated.

In one embodiment, a processor is configured to execute versioned store instructions of a first thread within a first mode of operation. In this embodiment, in the first mode of operation, the processor is configured to retire a versioned store instruction only after a version comparison has been performed for the versioned store instruction. In this embodiment the processor is configured to suppress retirement of instructions in the first thread that are younger than an oldest versioned store instruction until the oldest versioned store instruction has retired. In some embodiments, the processor is configured to execute versioned store instructions of a given thread within a second mode of operation, in which the processor is configured to retire outstanding versioned store instructions before a version comparison has been performed. The first and second modes of operation may allow a processor to provide the precise program state associated with a versioned store instruction that fails version comparison in the first mode while allowing improved performance in the second mode. The processor may be configured to execute within the first or second mode of operation on a per-thread basis, based on one or more programmable indicators.

These and other embodiments will become apparent upon reference to the following description and accompanying drawings.

BRIEF DESCRIPTION OF THE DRAWINGS

FIG. 1B is a diagram illustrating an exemplary timeline of execution of versioned store instructions in different modes according to one embodiment.

FIG. 6 is a generalized block diagram illustrating one embodiment of a truth table for a version number mismatch.

Figure 1A:
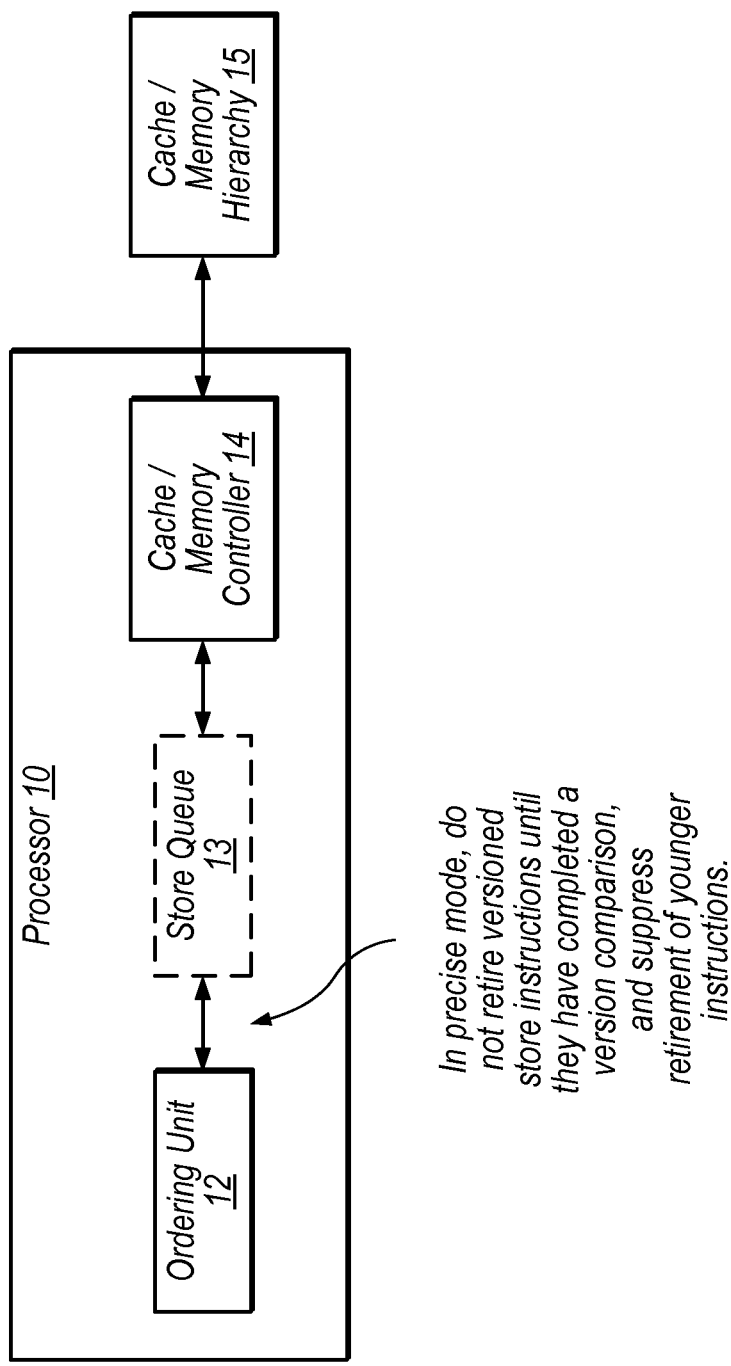
FIG. 1A is a block diagram illustrating one embodiment of a processor configured to execute versioned store instructions in a precise mode.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

This specification includes references to "one embodiment," "an embodiment," "one implementation," or "an implementation." The appearances of these phrases do not necessarily refer to the same embodiment or implementation. Particular features, structures, or characteristics may be combined in any suitable manner consistent with this disclosure.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

As used herein, the term "computer-readable medium" refers to a non-transitory (tangible) medium that is readable by a computer or computer system, and includes magnetic, optical, and solid-state storage media such as hard drives, optical disks, DVDs, volatile or nonvolatile RAM devices, holographic storage, programmable memory, etc. This term specifically does not include transitory (intangible) media (e.g., a carrier wave).

DETAILED DESCRIPTION

Figure 7:
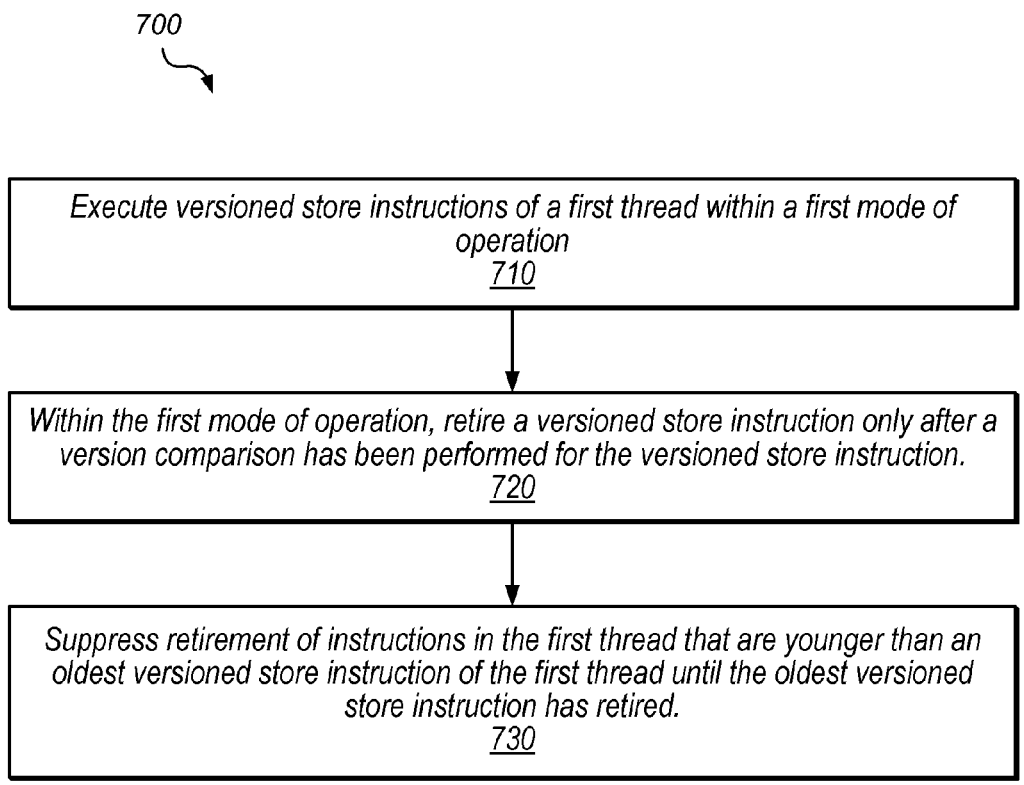
FIG. 7 is a flow diagram illustrating one embodiment of a method for executing versioned store instructions.

This disclosure initially describes, with reference to FIGS. 1A-1B, an overview of memory corruption detection (MCD) and a precise mode of execution for versioned store instructions. Exemplary embodiments of a processor and processing core are then described with reference to FIGS. 1C-2. Exemplary techniques for memory corruption detection are described with reference to FIGS. 3-6 while an exemplary method is shown in FIG. 7. In some embodiments, the techniques disclosed herein may allow reporting of the precise architectural state of a processor associated with a versioned store instruction that fails version comparison.

Overview of Memory Corruption Detection and Versioned Stores

As discussed above, memory corruption detection using versioned stores may prevent program crashes, unexpected program behavior, and/or malicious attacked associated with memory corruption. Software solutions exist for memory corruption detection. Debugging tools such as Oracle Solaris Studio, Purify, Valgrind, and Insure++ perform this detection. However, these debuggers typically perform instrumentation of the computer program, which may cause program execution to run hundreds of times slower.

In some embodiments, memory corruption detection may be performed in hardware. For example, data structures in memory may include a stored version number. Each memory access (e.g., load or store) to be checked for memory corruption detection may also include a version number. According to this methodology, if the version number of a given memory access does not match the version number of a corresponding data structure, a memory corruption condition is detected. Exemplary techniques for handing version information are discussed below with reference to FIGS. 3-6.

In various processor architectures, precise identification of versioned store instructions that cause memory corruption may be difficult, e.g., when multiple versioned stores are allowed to be retired and in-flight to version comparison hardware at the same time. Further, it may be difficult to report the precise architectural state of the processor associated with a given failed versioned store instruction, e.g., when versioned store instructions are retired before a version comparison is actually performed, allowing younger instructions to retire and alter the architectural state of the processor. Precise information may be desired by application developers, for example, for debugging purposes.

Overview of Precise Exceptions for Versioned Store Instructions

Referring now to FIG. 1A, a block diagram illustrating one embodiment of a processor 10 is shown. In the illustrated embodiment, processor 10 includes ordering unit 12, store queue 13, and cache/memory controller 14 and is coupled to cache/memory hierarchy 15.

Processor 10 may be configured to execute instructions for multiple threads using one or more instruction processing pipelines. In some embodiments, processor 10 is configured to execute instructions out of program order. Store queue 13, cache/memory controller 14, and cache/memory hierarchy 15 may be located within processor 10, partially within processor 10, or outside of processor 10 in various embodiments. In some embodiments, processor 10 may not include store queue 13.

Ordering unit 12, in the illustrated embodiment, is configured to maintain a program order of instructions. As used herein, the term "ordering unit" refers to a processing element configured to maintain instructions in program order, including information identifying each instruction. "Instruction" may refer to processor commands at various granularities including an instruction defined by a particular instruction set architecture (ISA) or a micro-operation selected based on an ISA instruction, for example. Ordering unit 12 may be a reorder buffer (ROB) or an ordered list of instructions in a scheduling unit, in some embodiments. In some embodiments, ordering unit 12 is configured to maintain program order for instructions that are speculative (e.g., instructions that may or may not be completed based on the direction of an earlier branch instruction). In some embodiments, processor 10 is configured to retire instructions from ordering unit 12 at some point after they are no longer speculative. In some embodiments, instructions are retired in program order. Thus, retirement of relatively younger instructions is suppressed, in these embodiments, until relatively older instructions have been retired.

In some embodiments, processor 13 is configured to place outstanding versioned store in store queue 13 to be checked for version match written to cache/memory hierarchy 15. In various embodiments, ordering unit 12 is configured to store information about stored instructions, such as program counter (PC) and effective address information. In some embodiments, store queue 13 is not configured to store this information, but is simply configured to queue store data and a target address for each store instruction, for example.

Store queue 13, in the illustrated embodiment, is configured to maintain store instructions that have not yet been performed in a cache or memory. Store instructions in store queue 13 may or may not be retired from ordering unit 12, e.g., depending on a mode of execution for a particular thread.

Cache/memory hierarchy 15 may include one or more caches and/or one or more memories. For example, in one embodiment, cache/memory hierarchy 15 includes L1, L2, and L3 data caches and a system memory. Caches may be write-back or write-through and may or may not be shared between processing cores.

Cache/memory controller 14, in the illustrated embodiment, is configured to perform retired store instructions, which may include adding store instructions to a global store ordering (e.g., among multiple threads) and writing the results of store instructions to a cache and/or memory in cache/memory hierarchy 15.

In some embodiments, for versioned store instructions, cache/memory controller 14 is configured to compare version information associated with the store instruction with version information stored at a location of the store in cache/memory hierarchy 15. In one embodiment, if the comparison fails, cache/memory controller 14 is configured to trigger an exception. In this embodiment, if the comparison does not fail, cache/memory controller 14 is configured to store data from the versioned store instruction at the target location in cache/memory hierarchy 15.

As used herein, the term "version information" refers to information associated with data at a particular location or over a particular time interval. Thus, version information may identify data at different points in time. For example, a first version number may be associated with data at a first point in time and a second version number may be associated with the data at a later point in time. Version information may also identify data at different locations. For example, a first version number may be associated with data stored in a first array, but a second version number may be associated with the same data when it is copied to a different array. Alternately, version information may remain associated with data when the data is copied to other locations. Version information may or may not be updated when associated data is modified. Version information may be implemented using any of various encodings. For example, a version number may be stored using a particular number of bits.

The phrase "versioned store instruction" refers to a store instruction that includes version information corresponding to the data to be stored by the store instruction. Execution of versioned store instructions may include "version comparison": a comparison of the version information included in the versioned store instruction with version information stored in a cache or memory and associated with a location at which the data is to be stored. In contrast, non-versioned store instructions may not include version information and are executed without a version comparison.

In some embodiments, processor 10 is configured to execute instructions of a given thread within a precise mode or within a disrupting mode. When operating in precise mode, in these embodiments, processor 10 is configured to retire versioned store instructions only after a version comparison has been performed. In these embodiments, retirement of instructions that are younger than an oldest versioned store instruction in a given thread is suppressed until the oldest versioned store instruction has retired. Operating in precise mode may allow processor 10 to maintain the precise architectural state of a thread, unmodified by younger instructions, which may be useful for debugging purposes. When operating in disrupting mode, in these embodiments, processor 10 is configured to retire outstanding versioned stores before version comparison has been performed. Disrupting mode may improve performance relative to precise mode (e.g., because younger instructions are allowed to retire sooner), but may not allow processor 10 to maintain precise architectural state information (e.g., because the younger instructions may modify the architectural state).

An instruction is "retired" or "committed" when a processor allows the instruction to update the architectural state of the processor. This often includes removing the instruction from an ordering unit, such as a ROB. In various embodiments, instructions within a given thread are retired in program order. Thus, retirement of a given instruction may allow retirement of younger instructions that are ready to retire. In these embodiments, waiting to retire a given instruction suppresses retirement of younger instructions for a given thread. A versioned store instruction that is retired may not actually be performed in a cache or memory or become part of a global store ordering. For example, in disrupting mode, if the versioned store instruction fails a version comparison after being retired, an exception may be triggered and the store may never be performed in cache or memory (e.g., the store data may never be placed at the target address).

A store instruction is "performed" in a cache in memory when the store data is placed in the cache or memory at a target location of the store. Performance of a store instruction typically includes adding the store to a global store ordering, such that the store is visible to other threads.

As used herein, the term "outstanding" in the context of a store instruction means that the store instruction is no longer speculative (based on retirement of older instructions) but has not yet been performed. A store may no longer be speculative once older instructions have been committed without triggering an exception or branching to another path of execution (e.g., that does not include the store). Thus, a store instruction may be described as outstanding during a time interval beginning when the store is no longer speculative based on older control transfer instructions and ending when the store's results have been written to a cache or memory and become part of a global store order (and thus visible to other threads). A store instruction may be outstanding both before and after it has been retired, as shown in FIG. 1B (discussed in further detail below).

As used herein, the term "exception" includes its well-known meaning in the art, including various traps, interrupts, etc. Exceptions often result in a pipeline flush and execution of a subroutine or trap handler. In some embodiments, an exception indicates that memory corruption has occurred. In some embodiments, an exception identifies the versioned memory access instruction (e.g., load or store) that caused the exception.

As used herein, the terms "thread" and "stream of execution" include their well-known meaning in the art and refer to an ordered sequence of instructions to be executed by a processor. Multi-threaded processors are configured to execute instructions from multiple threads, e.g., in parallel using multiple pipelines or by allowing multiple threads to take turns using a given pipeline.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). Thus, execution of a store instruction may refer in the first sense to processing of the store instruction throughout a pipeline or in the second sense to computing a target address for the store and obtaining the store data to be stored at the target address. As explained above, a store may be later "performed" in a cache or memory after it has been executed and retired.

Referring now to FIG. 1B, a diagram illustrating a timeline of execution of a versioned store instruction in precise and disrupting modes according to one embodiment is shown.

For disrupting mode, in the illustrated embodiment, versioned stores are first fetched, then become no longer speculative, then are retired (allowing retirement of younger instructions), then go through version comparison, and are then performed in a cache or memory and thus complete.

For precise mode, in the illustrated embodiment, versioned stores are first fetched, then become no longer speculative, then go through version comparison, then are retired (only after version comparison), then are performed in a cache or memory (the ordering of retirement and performance may vary in some embodiments). In precise mode, in this embodiment, retirement of younger instructions is suppressed until after a given versioned store instruction finishes version comparison and is later retired. This may preserve the architectural state associated with a given versioned store instructions, which may be valuable for debugging purposes, for example. It also may facilitate precise identification of a versioned store instruction that fails version comparison, because only one versioned store instruction is retired at a time for a given thread (e.g., because younger versioned store instructions are suppressed).

In various embodiments, processor 10 is configured to retire multiple outstanding non-versioned store instructions from ordering unit 12 at a time in both precise mode and disrupting mode. Non-versioned store instructions, in these embodiments, are not checked for memory corruption detection. In applications with more non-versioned stores than versioned stores, this may allow performance in precise mode to be nearly as great as in disrupting mode while allowing precise store information when exceptions occur. For example, database applications may utilize memory corruption detection for a system global area, but not for stacks or other database elements. In these applications, operations that use the system global area may be slower in precise mode, but overall performance may be nearly as great.

In various embodiments, processor 10 is configured to operate in precise or disrupting mode on a per-thread basis. For example, in these embodiments, processor 10 may be configured to execute instructions of a first thread in precise mode and instructions of a second thread in disrupting mode concurrently. Note that if multiple threads are executed in precise mode, multiple versioned stores from different threads may be in a retired state and checked for version comparison concurrently, because the restrictions in precise mode are performed on a per-thread basis in these embodiments.

In some embodiments, processor 10 may also be configured to operate in a non-MCD mode of operation in which version information for versioned store instructions is not checked at all. In some embodiments, processor 10 is configured to check version information for load instructions before they are retired, except when operating in non-MCD mode.

In some embodiments, in disrupting mode, processor 10 is not configured to precisely identify a versioned store instruction that failed a version comparison. In other embodiments, processor 10 is configured to precisely identify such instructions, even in disrupting mode. Because program counter and/or effective address information may be stored in ordering unit 12, this may require additional storage for such information (because versioned store instructions are allowed to retire from ordering unit 12 before version comparison in disrupting mode). In some embodiments, processor 10 may reduce or eliminate power provided to this additional storage when operating in precise mode, e.g., because the program counter (PC) and/or effective address information in ordering unit 12 can be used to precisely identify versioned store instructions that fail version comparison. In embodiments in which processor 10 is not configured to precisely identify a versioned store instruction that failed a version comparison in disrupting mode, this additional storage may be eliminated.

General Processor Overview

Figure 1C:
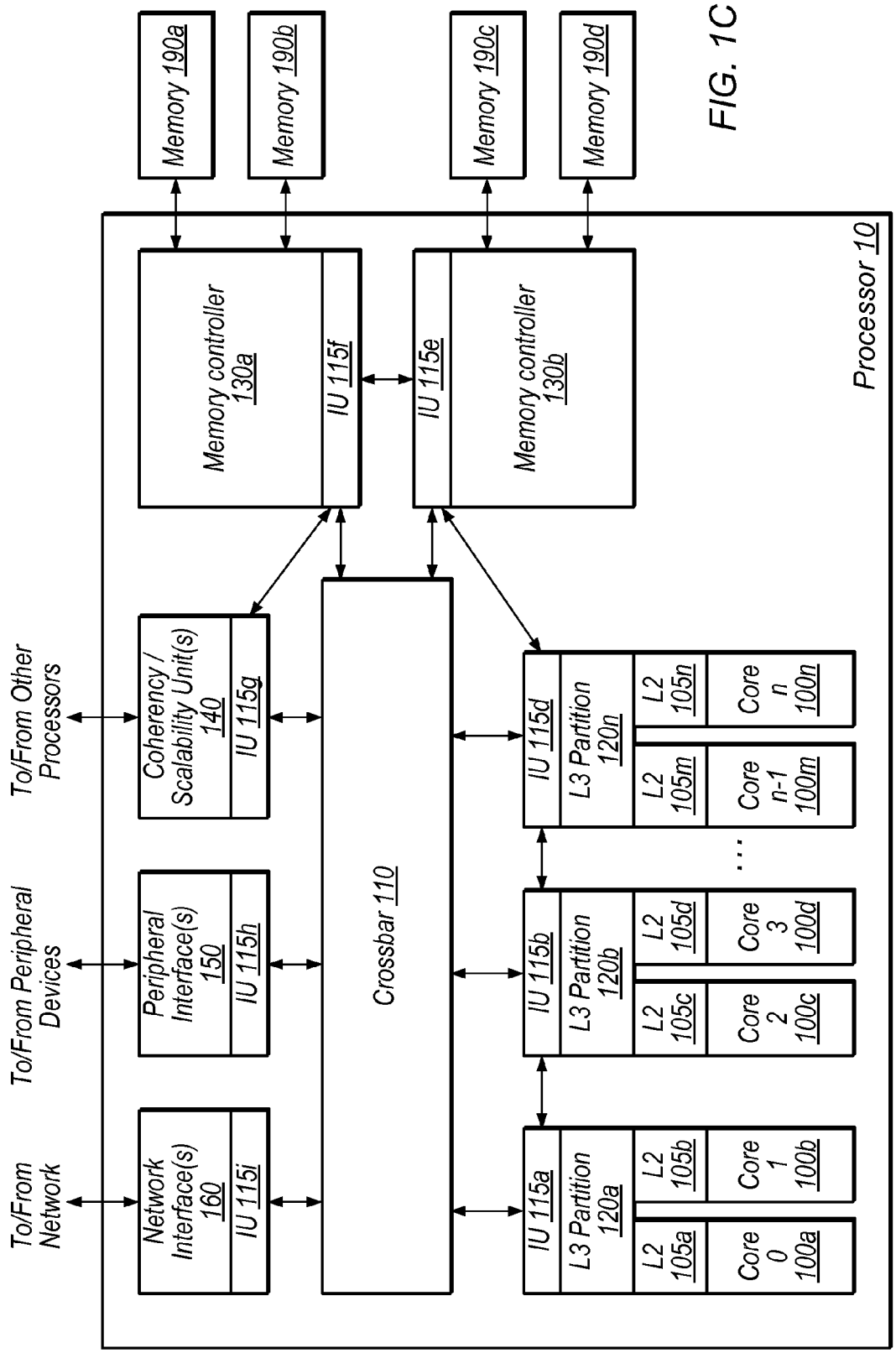
FIG. 1C is a block diagram illustrating one embodiment of a processor.

Turning now to FIG. 1C, a block diagram illustrating one exemplary embodiment of processor 10 is shown. In the illustrated embodiment, processor 10 includes a number of processor cores 100a-n, which are also designated "core 0" though "core n." As used herein, the term "processor" may refer to an apparatus having a single processor core or an apparatus that includes two or more processor cores. Various embodiments of processor 10 may include varying numbers of cores 100, such as 8, 16, or any other suitable number. In the illustrated embodiment, each of cores 100 is coupled to a corresponding L2 cache 105a-n, which in turn couple to L3 cache partitions 120a-n via interface units (IU) 115a-d. Cores 100a-n, L2 caches 105a-n, L3 partitions 120a-n, and interface units 115a-i may be generically referred to, either collectively or individually, as core(s) 100, L2 cache(s) 105, L3 partition(s) 120 and IU(s) 115, respectively. The organization of elements in FIG. 1C is exemplary only; in other embodiments the illustrated elements may be arranged in a different manner and additional elements may be included in addition to and/or in place of the illustrated processing elements.

Via IUs 115 and/or crossbar 110, cores 100 may be coupled to a variety of devices that may be located externally to processor 10. In the illustrated embodiment, memory controllers 130*a* and 130*b* are configured to couple to memory banks 190*a-d*. One or more coherency/scalability unit(s) 140 may be configured to couple processor 10 to other processors (e.g., in a multiprocessor environment employing multiple units of processor 10). Additionally, crossbar 110 may be configured to couple cores 100 to one or more peripheral interface(s) 150 and network interface(s) 160. As described in greater detail below, these interfaces may be configured to couple processor 10 to various peripheral devices and networks.

As used herein, the term "coupled to" may indicate one or more connections between elements, and a coupling may include intervening elements. For example, in FIG. 1C, IU 115*f* may be described as "coupled to" IU 115*b* through IUs 115*d* and 155*e* and/or through crossbar 110. In contrast, in the illustrated embodiment of FIG. 1C, IE 115*f* 220 is "directly coupled" to IU 115*e* because there are no intervening elements.

Cores 100 may be configured to execute instructions and to process data according to a particular instruction set architecture (ISA). In various embodiments it is contemplated that any desired ISA may be employed.

As shown in FIG. 1C, in one embodiment, each core 100 may have a dedicated corresponding L2 cache 105. In one embodiment, L2 cache 105 may be configured as a set-associative, write-back cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In some embodiments (not shown), each core 100 may include separate L2 data and instruction caches. Further, in some embodiments, each core 100 may include multiple execution pipelines each with associated L1 data and instruction caches. In these embodiments, each core 100 may have multiple dedicated L2 data and/or instruction caches. In the illustrated embodiment, caches are labeled according to an L1, L2, L3 scheme for convenience, but in various embodiments, various cache hierarchies may be implemented having various numbers of levels and various sharing or dedication schemes among processor cores.

Crossbar 110 and IUs 115 may be configured to manage data flow between elements of processor 10. In one embodiment, crossbar 110 includes logic (such as multiplexers or a switch fabric, for example) that allows any L2 cache 105 to access any partition of L3 cache 120, and that conversely allows data to be returned from any L3 partition 120. That is, crossbar 110 may be configured as an M-to-N crossbar that allows for generalized point-to-point communication. However, in other embodiments, other interconnection schemes may be employed. For example, a mesh, ring, or other suitable topology may be utilized. In the illustrated embodiment, IUs 115*a-g* are also coupled according to a ring topology. Thus, via IUs 115*a-g*, any L2 cache 105 may access any partition of L3 cache 120 via one of more of IUs 115 a-g. In various embodiments, various interconnections schemes may be employed between various elements of processor 10. The exemplary embodiment of FIG. 1C is intended to illustrate one particular implementation, but other implementations are contemplated.

In some embodiments, crossbar 110 and/or IUs 115 may include logic to queue data requests and/or responses, such that requests and responses may not block other activity while waiting for service. Additionally, in one embodiment, crossbar 110 and/or IUs 115 may be configured to arbitrate conflicts that may occur when multiple elements attempt to access a single L3 partition 120.

L3 cache 120 may be configured to cache instructions and data for use by cores 100. In the illustrated embodiment, L3 cache 120 is organized into multiple separately addressable partitions that may each be independently accessed, such that in the absence of conflicts, each partition may concurrently return data to one or more respective L2 caches 105. In some embodiments, each individual partition may be implemented using set-associative or direct-mapped techniques. For example, in one embodiment, each L3 partition 120 may be an 8 megabyte (MB), 16-way set associative partition with a 64-byte line size. L3 partitions 120 may be implemented in some embodiments as a write-back cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer partitions, or in a scheme that does not employ independently-accessible partitions; it may employ other partition sizes or cache geometries (e.g., different line sizes or degrees of set associativity); it may employ write through instead of write-back behavior; and it may or may not allocate on a write miss. Other variations of L3 cache 120 configuration are possible and contemplated.

In some embodiments, L3 cache 120 implements queues for requests arriving from and results to be sent to crossbar 110 and/or IUs 115. Additionally, L3 cache 120 may implement a fill buffer configured to store fill data arriving from memory controller 130, a write-back buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 partitions 120 may variously be implemented as single-ported or multiported (i.e., capable of processing multiple concurrent read and/or write accesses). In either case, L3 cache 120 may implement arbitration logic to prioritize cache access among various cache read and write requestors.

Memory controllers 130*a-b* may be configured to manage the transfer of data between L3 partitions 120 and system memory, for example in response to cache fill requests and data evictions. Memory controller 130 may receive read and write requests and translate them into appropriate command signals to system memory. Memory controller 130 may refresh the system memory periodically in order to avoid loss of data. Memory controller 130 may be configured to read or write from the memory by selecting row and column data addresses of the memory. Memory controller 130 may be configured to transfer data on rising and/or falling edges of a memory clock. In some embodiments, any number of instances of memory interface 130 may be implemented, with each instance configured to control respective one or more banks of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory. In the illustrated embodiment, memory controller 130 is included in processor 10. In other embodiments, memory controller 130 may be located elsewhere in a computing system, e.g., included on a circuit board or system-on-a-chip and coupled to processor 10. Memory controller 130 may not correspond to cache/memory controller 14, in some embodiments (e.g., cache/memory controller 14 may be located within a core 100 in some embodiments).

Processor 10 may be configured for use in a multiprocessor environment with other instances of processor 10 or other compatible processors. In the illustrated embodiment, coherency/scalability unit (s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of a standard peripheral interface. For example, one embodiment of peripheral interface 150 may implement the Peripheral Component Interface Express (PCI-Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express™.

Network interface 160 may be configured to coordinate data transfer between processor 10 and one or more network devices (e.g., networked computer systems or peripherals) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Exemplary Processor Core

Figure 2:
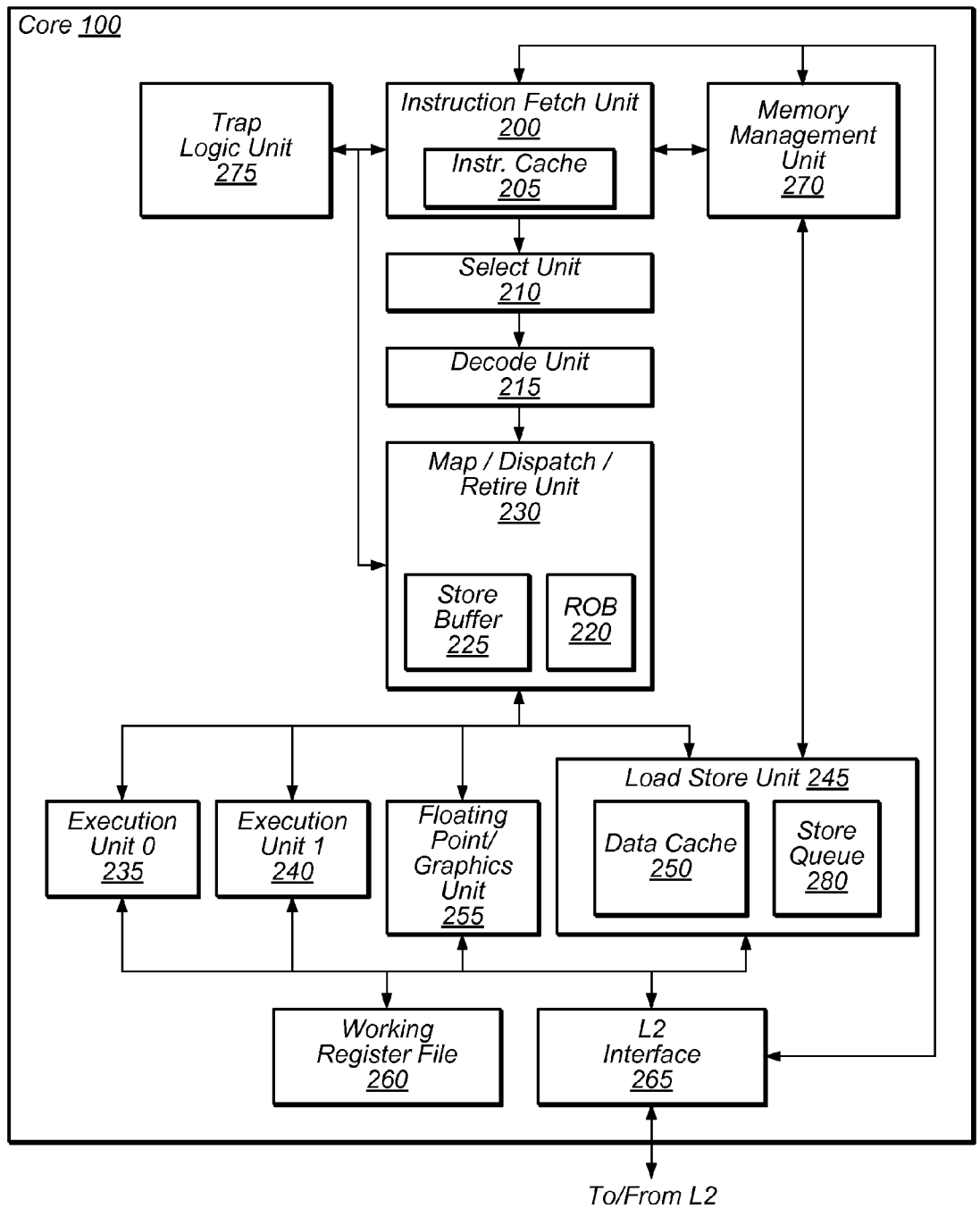
FIG. 2 is a block diagram illustrating one embodiment of a processor core.

Turning now to FIG. 2, one exemplary embodiment of core 100 is shown. In the illustrated embodiment, core 100 includes an instruction fetch unit (IFU) 200 that includes an instruction cache 205. IFU 200 is coupled to a memory management unit (MMU) 270, L2 interface 265, trap logic unit (TLU) 275, and map/dispatch/retire unit 230. IFU 200 is additionally coupled to an instruction processing pipeline that begins with a select unit 210 and proceeds in turn through a decode unit 215, and a map/dispatch/retire unit 230. Map/dispatch/retire unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating-point/graphics unit (FGU) 255. In this embodiment, these instruction execution resources are coupled to a working register file 260. Additionally, LSU 245 is coupled to L2 interface 265 and MMU 270.

In the following discussion, exemplary embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200, in one embodiment, is configured to provide instructions to the rest of core 100 for execution. In one embodiment, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing. In one embodiment, during each execution cycle of core 100, IFU 200 may be configured to select one thread that will enter the IFU processing pipeline. In some embodiments, a given processing pipeline may be configured to execute instructions for multiple threads. Thread selection may take into account a variety of factors and conditions, some thread-specific and others IFU-specific. Any suitable scheme for thread selection may be employed.

Once a thread has been selected for fetching by IFU 200, instructions may actually be fetched for the selected thread. To perform the fetch, in one embodiment, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In one embodiment, during any given execution cycle of core 100, select unit 210 may be configured to select one or more instructions from a selected threads for decoding by decode unit 215. In various embodiments, differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution.

Register renaming may facilitate the elimination of certain dependencies between instructions (e.g., write-after-read or "false" dependencies), which may in turn prevent unnecessary serialization of instruction execution. In one embodiment, map/dispatch/retire unit 230 may be configured to rename the logical (i.e., architected) destination registers specified by instructions by mapping them to a physical register space, resolving false dependencies in the process. In some embodiments, map/dispatch/retire unit 230 may maintain mapping tables that reflect the relationship between logical registers and the physical registers to which they are mapped.

Once decoded and renamed, instructions may be ready to be scheduled for execution. In the illustrated embodiment, map/dispatch/retire unit 230 may be configured to pick (i.e., schedule/dispatch) instructions that are ready for execution and send the picked instructions to various execution units. In one embodiment, map/dispatch/retire unit 230 may be configured to maintain a schedule queue that stores a number of decoded and renamed instructions. In one embodiment, ROB 220 is configured to store instructions based on their relative age in order to allow completion of instructions in program order. In some embodiments, speculative results of instructions may be stored in ROB 220 before being committed to the architectural state of processor 100, and confirmed results may be committed/retired in program order. Entries in ROB 220 may be marked as ready to commit when their results are allowed to be written to the architectural state. Store instructions may be posted to store queue 280 and retired from ROB 220 before their results have actually been performed in a cache or memory, e.g., as described above with reference to FIG. 1B.

Store buffer 225, in one embodiment, is configured to store information (e.g., store data and target address) for store instructions until they are ready to go through version comparison and be performed, at which point the store instructions are sent to store queue 280.

In one embodiment, store instructions are maintained in store queue 280 rather than store buffer 225 after they are retired. In precise mode, in some embodiments, store data is maintained in store queue 280 while PC and/or effective address information is maintained in ROB 220 until a version comparison has been performed, at which point the versioned store instructions are allowed to retire. Operating in precise mode may eliminate the need to maintain PC and/or effective address information elsewhere in order to precisely identify store instructions that fail a MCD check. For example, in precise mode, store queue 280 may power-gate or otherwise reduce power consumption to SRAM used to store PC or effective address information for versioned store instructions, because that information is maintained in ROB 220 until after a version comparison has been completed. In some embodiments, store instructions are initially performed in L2 cache 105.

Map/dispatch/retire unit 230 may be configured to provide instruction sources and data to the various execution units for picked instructions. In one embodiment, map/dispatch/retire unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from map/dispatch/retire unit 230 may proceed to one or more of the illustrated execution units for execution. In one embodiment, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculation and for load/store instructions executed by LSU 245. EXU1 240 may be configured to execute integer instructions issued from slot 1, as well as branch instructions. In one embodiment, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments, execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In one embodiment, data cache 250 may be configured as a set-associative, write-through cache in which all stores are written to L2 cache 105 regardless of whether they hit in data cache 250. In this embodiment, store instructions may be complete when their results are written to an L2 cache 105. In this embodiment, processor 10 may retrieve version information from L2 cache 105 for comparison with version information associated with versioned store instructions. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations. LSU 245 may include a miss buffer configured to store outstanding loads and stores that cannot yet complete, for example due to cache misses. In the illustrated embodiment, LSU 245 includes store queue 280 configured to store address and data information for stores, in order to facilitate load dependency checking and provide data for version comparison. LSU 245 may also include hardware configured to support atomic load-store instructions, memory-related exception detection, and read and write access to special-purpose registers (e.g., control registers).

Floating-point/graphics unit 255 may be configured to execute and provide results for certain floating-point and graphics-oriented instructions defined in the implemented ISA. For example, in one embodiment FGU 255 may implement single- and double-precision floating-point arithmetic instructions compliant with the IEEE 754-1985 floating-point standard, such as add, subtract, multiply, divide, and certain transcendental functions. Also, in one embodiment FGU 255 may implement partitioned-arithmetic and graphics-oriented instructions. Additionally, in one embodiment FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 275 may be configured to manage the handling of such events. TLU 275 may also be configured to coordinate thread flushing that results from branch misprediction or exceptions. For instructions that are not flushed or otherwise cancelled due to mispredictions or exceptions, instruction processing may end when instruction results have been committed and/or performed.

In various embodiments, any of the units illustrated in FIG. 2 may be implemented as one or more pipeline stages, to form an instruction execution pipeline that begins when thread fetching occurs in IFU 200 and ends with result commitment by map/dispatch/retire unit 230. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations. In some embodiments, a core 100 includes multiple instruction execution pipelines.

Exemplary Embodiments of Memory Corruption Detection

Figure 3:
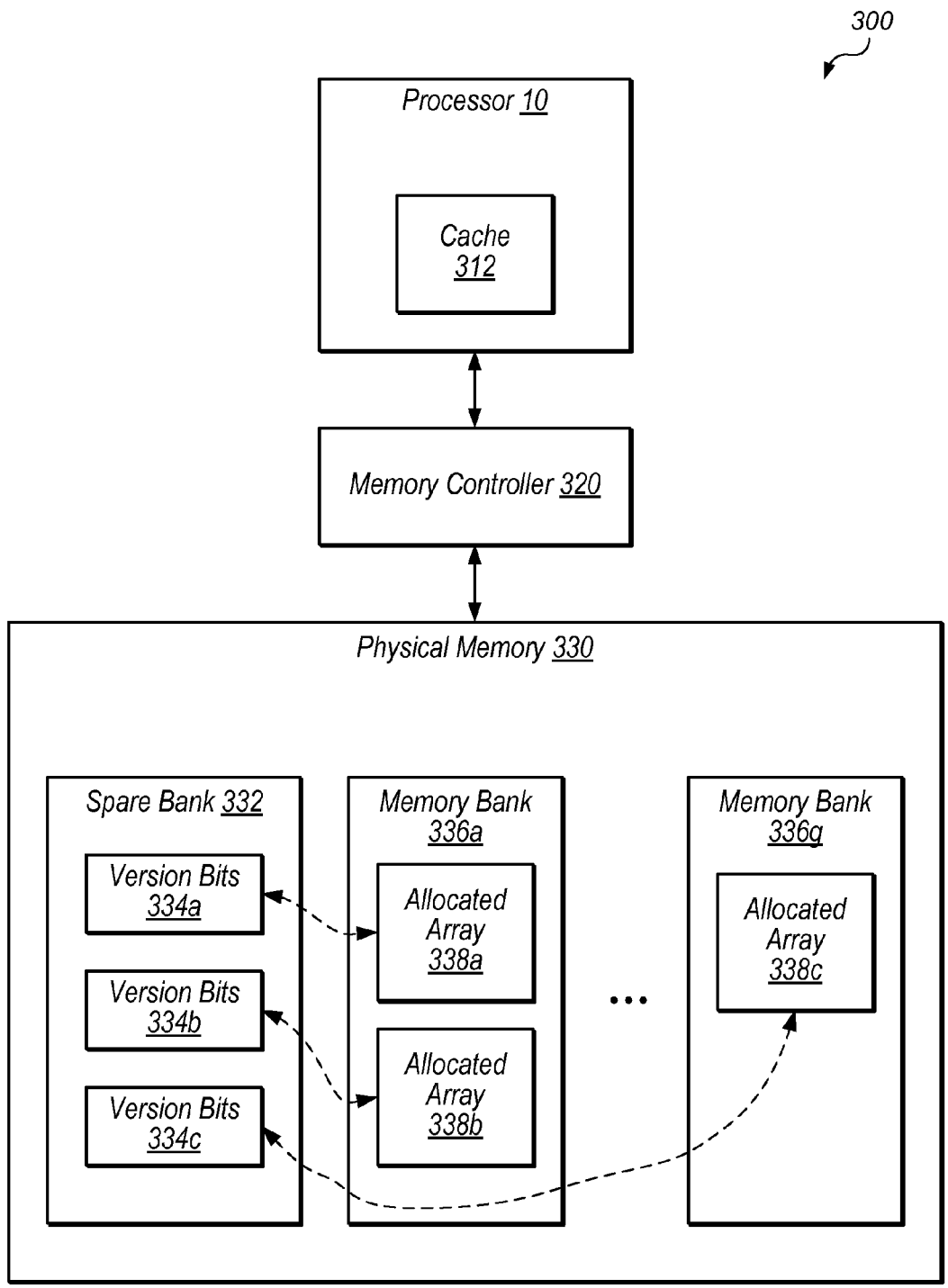
FIG. 3 is a block diagram illustrating one embodiment of a processor and a physical memory that includes spare banks for version information.

Turning now to FIG. 3, a generalized block diagram illustrating one embodiment of a computing system 300 is shown. In the illustrated embodiment, physical memory 330 is arranged so as to facilitate memory corruption detection.

System 300 includes processor 10, memory controller 320, and physical memory 330. Processor 10 includes cache 312 (which may be a single cache or a partitioned cache as shown in the embodiment of FIG. 1C). Physical memory 330 may be coupled to lower levels of a memory hierarchy, such as a disk memory and offline archive memory. These lower levels of memory are not shown for ease of illustration. Although only one processor 10 is shown, it is possible and contemplated system 100 may include multiple processors and multiple associated caches. In one embodiment, physical memory 330 comprises dynamic random access memory (DRAM).

Spare-bank memory and memory mirroring are advanced mechanisms that enable systems to handle memory errors, such as multi-bit errors. In one embodiment, the physical memory 330 comprises a spare-bank DRAM. The spare-bank memory feature may be implemented in memory controller 330 and the system basic input/output system (BIOS) software. This feature may enable administrators to configure a spare row, or bank, of memory for spare use. It is noted that while the present discussion describes the use of spare memory banks for the storage of version information, the methods and mechanisms described herein are applicable using alternative non-spare bank storage. For example, version information may simply be stored in alternative locations within memory. For example, version information corresponding to an address N may be stored at a given displacement such as N+10000. Alternatively, the version information may be stored at a location which is based on another computation related to an access address. In some embodiments, dedicated shadow memory may be utilized to store version information. In various embodiments, version information is stored in such a manner that only a single memory access is required to obtain both the requested data and corresponding version information. For example, the version information may be stored in close proximity to the requested data so that both are obtained in a single access. Numerous such alternatives are possible and are contemplated.

The physical memory 330 may store one or more software applications (not shown) that are later compiled and loaded into the cache memory subsystem. Generally speaking, for a given software application, the kernel of an operating system sets up an address space for the application, loads the application's code into the physical memory 330, sets up a stack for the application, branches to a given location inside the application, and begins execution of the application. Dynamic objects accessed with pointers may be allocated during program execution. As shown, one or more arrays 338a-338c of bytes may be allocated during the execution of one or more software applications. While arrays are used herein as one example of a data structure, the methods and mechanisms described are applicable to other types of data structures as well.

In one embodiment, each of the allocated arrays 338a-338c has associated version bits of the version bits 334a-334c stored in the spare bank 332. The spare bank 332 may be borrowed for the purpose of storing the version bits to be used for memory corruption detection. An access to a memory location within one of the allocated arrays 338a-338c by a read or a write operation may cause the data stored in that memory location to be returned to processor 10. The associated version bits for the accessed memory location may be returned to the processor along with the data. For example, if a memory location within the allocated array 338a is accessed, then the version bits 334a may be returned to the processor 10 along with the accessed data within the allocated array 338a.

Each memory access may utilize both an address and a version number indicated by the version bits. In one embodiment, when data is written to memory, the hardware in the processor 10 or memory controller 320 may verify the version bits from the store operation match the associated version bits recorded in the spare bank 332. When data is loaded, a similar process may occur. An error may be flagged when a mismatch is found.

In one embodiment, the physical memory 330 or memory controller 320 may return a value of zero to the processor 10 for any associated version number for a memory access. The value of zero may indicate a "not set" state for the version number. In this case processor 10 and/or memory controller 320 may not compare the version bits provided by the application against those provided by hardware. In one embodiment, the application may continue running although the memory location was not one that was supposed to be accessible through the pointer used by the software.

Exemplary Array Allocation with Memory Corruption Detection

Consider an exemplary situation in which an array is to be allocated. An array is a common data structure and is used herein for exemplary purposes, but in various embodiments, various data structures may be implemented and manipulated using the techniques described herein.

In order to allocate the array, a subroutine such as a calloc or malloc subroutine used in the C and C++ programming languages may be called. In this situation, processor 10 may determine version information for the array. The determination may be performed by an operating system (OS) executing on processor 10.

In one embodiment, processor 10 is configured to write zeros to the location(s) of the allocated array and the version information in one or more locations associated with the array. In one embodiment, version information may be stored for each entry in the array. In another embodiment, version information may be stored for each block of data in the array that is the size of a cache line. Such version information may be carried along with an associated cache line throughout an entire memory system.

Exemplary Array Copy with Memory Corruption Detection

Now consider an exemplary situation in which an array (or other data structure) is to be copied to a new destination location (e.g., using a memcpy subroutine in the C and C++ programming languages). In one embodiment, processor 10 is configure to check version information associated with both a source location and a destination location. For example, processor 10 may provide version information that is expected to match stored version information associated with the source and/or destination locations. In some embodiments, processor may determine that an acceptable version information match occurred based on an actual version match or based on detecting a reserved version number associated with the destination.

Consider a more specific exemplary situation in which memory corruption detection occurs because a pointer is incremented beyond the end of an array during a copy operation. For example, an array with 100 elements may be indexed 0 through 99. This array may have been allocated with associated version information as described above. A memory operation may request to copy an array element to a position at index 100 (i.e., a location just outside of the array). In this situation, processor 10 may determine whether stored version information associated with the source location (e.g. source array[100]) corresponds to expected version information associated with the source array. Similarly, processor 10 may determine whether stored version information associated with a destination location (e.g., destination array[100]) matches expected version information associated with the destination array. In this situation where index 100 is not included in either the source or destination array, processor 10 may detect a mismatch between expected version information and stored version information.

Based on comparison of version information, in some embodiments, processor 10 is configured not to perform a memory operation or some portion thereof in response to detecting a mismatch between stored and expected version information. In some embodiments, processor 10 is configured to indicate the occurrence of a mismatch, e.g., by initiating an exception.

In some embodiments, processor 10 is configured to preserve or overwrite version information associated with such a copy operation. For example, when copying the array from an initial location to a destination location, processor 10 is may store version information to a location associated with the destination (i.e., overwriting the version information). On the other hand, processor 10 may not modify version information associated with the destination (i.e., preserving the version information). Processor 10 may determine whether to preserve or overwrite version information for various reasons.

For example, when an OS moves pages of memory in a way that is not observable by applications (e.g., because the applications use a virtual address to access the pages), it may be desirable to overwrite version information associated with the destination, such that the version information remains the same for an application accessing data on a particular page after the page is moved by the OS. On the other hand, when an application moves chunks of data, it may or may not be desirable to overwrite version information associated with the destination. In general, it may be more common for an application to preserve version information associated with destinations of copy operations. For example, a given buffer used by an application may keep the same version number even when information is moved into or out of the buffer.

Similarly to the above description of a copy operation, processor 10 is may be configured to check, preserve, and/or overwrite version information when performing various memory operations such as clearing, decompressing, compress, setting, etc.

Figure 4:
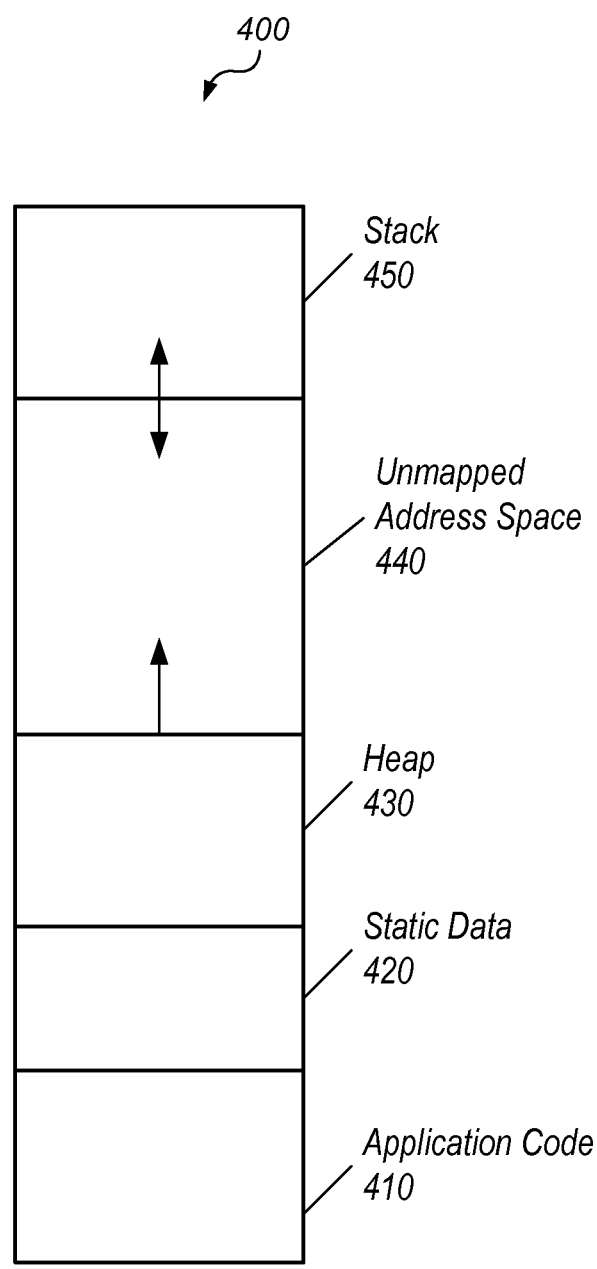
FIG. 4 is a generalized block diagram illustrating one embodiment of a process address space.

Referring now to FIG. 4, a generalized block diagram illustrating one embodiment of a process address space 400 is shown. The address space for a given process may be a contiguous virtual address space, wherein a mapping between virtual addresses and physical addresses determines the location of data values and application code in physical memory 330. The interaction of compilers and high-level languages affects how a software application uses an instruction set architecture (ISA). Software application development uses a number of variables to be allocated and addressed and a number of registers used to allocate variables. In one embodiment, the static data 420, the stack 450, and the heap 430 determine data allocation for the application code 410.

The static data 420 may be used to allocate statically declared objects, such as global variables and constants. A majority of these objects may be arrays. The stack 450 may be used to allocate scalar variables rather than arrays, such as local variables and parameters in the functions currently being invoked. The stack 450 may be grown and shrunk on procedure call or return, respectively. The heap 430 may be used to allocate dynamic objects accessed with pointers and are typically not scalar variables. The heap 430 may be used to reduce the frequency of copying the contents of strings and lists by storing the contents of temporary strings or lists during the string/list operations. The heap is not affected by the return of the function call.

Figure 5:
FIG. 5 is a generalized block diagram illustrating one embodiment of memory access address formats that include version information.
Figure 5:
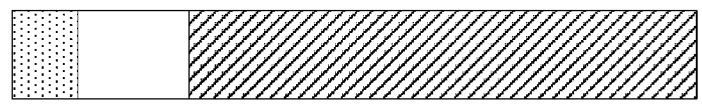
Figure 5:
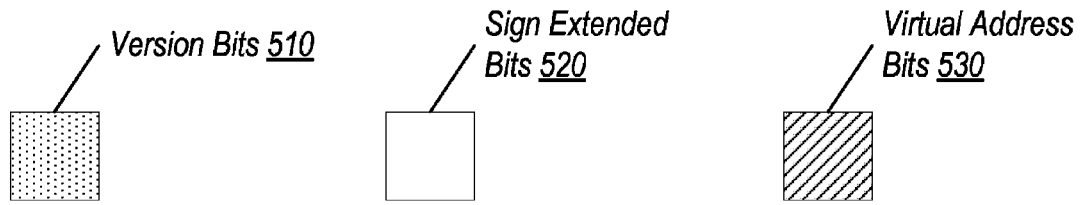

Turning now to FIG. 5, a generalized block diagram illustrating one embodiment of memory access address formats is shown. Modern computing systems use virtual memory in order to share a smaller amount of physical memory among many processes. An address space may be a contiguous virtual address space, wherein a mapping between virtual addresses and physical addresses determines the location of stored data in physical memory.

When software allocates a region of memory, such as with a calloc or a malloc C++ subroutine used for dynamic memory allocation, a version number may be assigned to the allocated array. The subroutine and/or a heap manager may utilize a modified block initialization store instruction within an iterative loop to zero out the allocated array. In one embodiment, memory controller 320 may zero out the allocated array based on a command issued by a processor core for the subroutine. Memory controller 320 may operate on a cache line basis. For example, 128 store operations may be used to allocate an 8-kilobyte (KB) array, wherein each cache line is 64 bytes. In addition, memory controller 320 may cause an associated version number to be stored in an associated location such as in spare bank 332 shown in FIG. 3.

In one embodiment, the OS is made aware of extra meta-data being used for memory access operations through a state bit, such as a memory corruption detection (mcd) state bit. In one embodiment, when the mcd state bit is deasserted, the most-significant bit (MSb) of the virtual address bits 530 is sign extended to provide the sign-extended bits 520. In one embodiment, if the bits 520 do not equal a sign-extended value of the MSb of the virtual address bits 530, an exception may occur.

In one embodiment, when the mcd state bit is asserted, the MSb of the virtual address bits 530 is sign-extended for a smaller portion of the total address. The sign-extended value 520 is smaller in this case. In one embodiment, the upper bits of the memory access address store an associated version number 510 to be used for later comparisons. In one embodiment, the memory access address is a 64-bit value. The virtual address 530 comprises bits 53 to 0. When the mcd state bit is asserted, the sign-extended value 520 comprises bits 59 to 54 and the version number 510 comprises bits 63 to 60. Although the bits in the memory access addresses are shown in this particular order, other combinations are possible and other or additional bits may be utilized as well. Some embodiments may not include sign extended bits 520, or may require that these bits be set to some predefined pattern, for example. The bits storing information for the portions 510-530 may or may not be contiguous. Similarly, the arrangement of the portions 510-530 may use other placements for better design trade-offs. In other embodiments, version information may be associated with versioned store instructions using other techniques, including various approaches that may or may not store version information within address bits.

Turning now to FIG. 6, a generalized block diagram illustrating one embodiment of a truth table for a version number mismatch is shown. In one embodiment, the possible values for a version number that may be used are in either an available set or a reserved set. The version numbers in a reserved set may indicate either memory is not utilizing version numbers or memory is unable to utilize version numbers. For example, when a hardware failure occurs in the DRAM and a failover mechanism begins to use the spare bank 332, the stored version numbers may not be used anymore. In another example, an uncorrectable error has occurred and the memory does not return valid data.

In one embodiment, one value for the reserved set may be sufficient to handle the conditions described above. However, another version number value may be used in the reserved set to ease software adoption of the mcd state. For example, as shown in FIG. 4, the heap 430 may occupy a lower half of a virtual address space. In such a case, the most-significant bits of an associated virtual address may comprise binary 0's. The stack 450 and shared libraries may occupy an upper half of the virtual address space. The most-significant bits of an associated virtual address may comprise binary 1's. A single version number value in the reserved set may make it difficult for software, such as the OS, to determine if pointers to the upper half of the virtual address space have associated version numbers in the available set. For example, for a 4-bit version number 0xF, wherein 0x denotes a hexadecimal value, this value may indicate either an associated memory access address corresponds to a memory location with a version number equal to 0xF or the memory access address corresponds to a memory location that is not assigned a version number. To simplify logic, both a 0x0 value and a 0xF value may be placed in the reserved set. For the 4-bit version number example, the other values between 0x0 and 0xF may be placed in the available set. Various numbers of version bits are contemplated and any appropriate number of version bits may be used to encode version information.

The software may use the version number values in the available set for assigning version numbers to allocated arrays 338*a*-338*c*. The values "A" and "B" represent two different members of the available set, but the values A and B do not equal one another. In one example, when a version number comprises 4 bits, a reserved set may include the 2 values 0x0 and 0xF, and an available set may include the 14 values 0x1 to 0xE.

As shown in the truth table, a version mismatch may occur when a version number in a memory access address corresponding to a load or a store operation from the processor 10 is in the available set, but it does not match the version number stored in the spare bank 332 associated with the memory location identified by the memory access address. In addition, the version number stored in the spare bank 332 is in the available set for a mismatch to occur. When a version number stored in the spare bank 332 is within the reserved set, a mismatch does not occur as shown in the table. When a version number in a memory access address corresponding to a load or a store operation from the processor 302 is in the reserved set, an unexpected condition has occurred. Accordingly, this unexpected occurrence causes a mismatch to be detected.

Referring now to FIG. 7, a flow diagram illustrating one embodiment of a method 700 for executing versioned store instructions is shown. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 710.

At block 710, versioned store instructions of a first thread are executed within a first mode of operation. The first mode of operation may be precise mode, in some embodiments. Flow proceeds to block 720.

At block 720, within the first mode of operation, a versioned store instruction is retired only after a version comparison has been performed for the versioned store instruction. In one embodiment, this may involve sending the versioned store instruction to store queue 280 before the versioned store instruction has been retired. Flow proceeds to block 730.

At block 730, retirement of instructions in the first thread that are younger than an oldest versioned store instruction of the first thread is suppressed until the oldest versioned store instruction has retired. In some embodiments, this is a result of retiring instructions in program order. In various embodiments, this may allow processor 10 to maintain architectural state information associated with the versioned store instruction, wherein the state information is not modified by instructions that are younger than the versioned store instruction. This information may be useful for debugging purposes. In other embodiments, the method may include executing versioned store instructions of a second thread within a second mode of operation, e.g., disrupting mode. Disrupting mode may improve performance because retiring versioned store instructions before version comparison may free younger instructions to retire instead of waiting for version comparison. Flow ends at block 730.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor configured to execute versioned store instructions of a first thread within a first mode of operation, wherein the first mode is a debugging mode in which retirement control circuitry included in the processor is configured to:
   retire, from an ordering unit, each versioned store instruction in the first thread only after a respective version comparison has been performed, wherein the comparison is between version information included in that versioned store instruction and version information stored at a target location of that versioned store instruction; and
   suppress retirement of instructions in the first thread that are younger than an oldest versioned store instruction of the first thread until the oldest versioned store instruction has retired;

wherein the processor is further configured to execute versioned store instructions of a given thread within a second mode of operation, wherein the second mode is a disrupting mode in which:
   the retirement control circuitry is configured to retire at least one outstanding versioned store instruction before a version comparison has been performed for the at least one outstanding versioned store instruction;
   the processor is configured to perform the version comparison, between version information included in the at least one versioned store instruction and version information stored at a target location of the at least one versioned store instruction, subsequent to retirement of the at least one outstanding versioned store instruction; and
   instructions younger than the at least one versioned store instruction are allowed to commit results to the architectural state of the processor before the version comparison has been performed.

2. The processor of claim 1, wherein the processor is configured to execute versioned store instructions of a second thread within the second mode of operation concurrently with executing versioned store instructions of the first thread within the first mode of operation.

3. The processor of claim 1, wherein the processor is configured to operate within either the first mode or the second mode for a given thread based on a programmable indicator.

4. The processor of claim 1, wherein the processor is configured, in response to a failed version comparison for a given versioned store instruction when operating in the first mode, to maintain architectural state information for the first thread, wherein instructions younger than the given versioned store instruction did not modify the architectural state information.

5. The processor of claim 1, wherein the processor is configured, when operating within the first mode of operation, to perform a version comparison for only a versioned store instruction that is currently an oldest non-retired versioned store instruction of the first thread.

6. The processor of claim 1, wherein, for a given versioned store instruction, the processor is configured to:
   compare version information associated with the versioned store instruction with version information stored in a cache or memory, wherein the version information stored in the cache or memory is associated with a memory object at a target location of the store instruction;
   retire the versioned store instruction from an ordering unit of the processor; and
   perform the versioned store instruction in a cache or memory, wherein the cache or memory is included in or coupled to the processor.

7. A method, comprising:
   executing, by a load/store unit of a processor, versioned store instructions of a first thread within a first mode of operation, wherein the first mode is a debugging mode, including:
      retiring, by retirement control circuitry, each versioned store instruction in the first thread only after a respective version comparison has been performed, where the comparison is between version information included in that versioned store instruction and version information stored at a target location of that versioned store instruction; and
      suppressing, by the retirement control circuitry, retirement of instructions in the first thread that are younger than an oldest versioned store instruction of the first thread until the oldest versioned store instruction has retired; and executing, by the load store unit, versioned store instructions of a second thread within a second mode of operation, wherein the second mode is a disrupting mode, in which;

the processor retires at least one outstanding versioned store instruction before a version comparison has been performed for the at least one outstanding versioned store instruction;

the processor performs a version comparison, between version information included in the at least one versioned store instruction and version information stored at a target location of the at least one versioned store instruction, subsequent to retirement of the at least one outstanding versioned store instruction; and instructions younger than the versioned store instructions are allowed to commit results to the architectural state of the processor before the version comparison has been performed.

8. The method of claim 7, wherein the executing within the first mode of operation is performed in response to selection of the first mode of operation by an application.

9. The method of claim 7, further comprising: maintaining architectural state information for the first thread, wherein the architectural state information is associated with a given versioned store instruction and wherein instructions younger than the given versioned store instruction do not modify the architectural state information until the given versioned store instruction has successfully completed version comparison.

10. The method of claim 7, wherein the executing includes allowing at most one versioned store instruction of the first thread to be in a phase of execution between beginning version comparison and performance in a cache or memory.

11. The method of claim 10, wherein the executing includes allowing multiple non-versioned store instructions of the first thread at a time to be in the phase of execution between beginning version comparison and performance in a cache or memory.

12. The method of claim 7, further comprising executing instructions within a third mode of operation, including retiring and performing versioned store instructions without performing version comparison.

13. An apparatus, comprising:

a reorder buffer configured to maintain a program order of instructions and to retire instructions in program order; and a memory controller configured to compare version information for versioned store instructions with version information stored in cache or memory locations corresponding to the store instructions;

wherein the apparatus is configured execute instructions of a first thread according to a first mode of operation in which the apparatus is configured to retire a versioned store instruction from the reorder buffer only after a version comparison for the versioned store instruction has been performed; and wherein the apparatus is configured to execute versioned store instructions of a second thread within a second mode of operation, in which the apparatus is configured to retire at least one outstanding versioned store instruction before a version comparison has been performed for the at least one outstanding versioned store instruction, in which the apparatus is configured to perform a version comparison for the at least one outstanding versioned store instruction subsequent to retirement of the at least one outstanding versioned store instruction, and in which instructions younger than the versioned store instructions are allowed to commit results to the architectural state of the apparatus before the version comparison has been performed.

14. The apparatus of claim 13, wherein the apparatus is configured to operate within the first or the second mode of operation based on an indication from an application running on the apparatus.

15. The apparatus of claim 13, further comprising:

a store queue configured to maintain store data and target addresses for store instructions during version comparison;

wherein the reorder buffer is configured to maintain program counter information for versioned store instructions until they are retired.

16. The apparatus of claim 13, wherein the apparatus is configured to initiate an exception that identifies the versioned store instruction in response to the versioned store instruction failing the version comparison.

17. The apparatus of claim 13, further comprising:

first and second buffers;

wherein the apparatus is configured to maintain store data for versioned store instructions in the first buffer until they are ready to proceed to version comparison, then send the store data to the second buffer; and wherein the apparatus is configured to send at most one versioned store instruction to the second buffer at a time within the first mode of operation.

\* \* \* \* \*

UNITED STATES PATENT AND TRADEMARK OFFICE
CERTIFICATE OF CORRECTION

| | | |
|---|---|---|
| PATENT NO. | : 9,672,298 B2 | Page 1 of 1 |
| APPLICATION NO. | : 14/267734 | |
| DATED | : June 6, 2017 | |
| INVENTOR(S) | : Zoran Radovic et al. | |

It is certified that error appears in the above-identified patent and that said Letters Patent is hereby corrected as shown below:

On the Title Page

Item (54), and in the Specification, Column 1, Lines 1-2 please delete "PRECISE EXCECUTION OF VERSIONED STORE INSTRUCTIONS" and insert --PRECISE EXECUTION OF VERSIONED STORE INSTRUCTIONS--.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*